(12) United States Patent
Sidorin et al.

(10) Patent No.: US 7,149,377 B2
(45) Date of Patent: Dec. 12, 2006

(54) SOLAR TUNABLE FILTER ASSEMBLY

(75) Inventors: Yakov Sidorin, Tucson, AZ (US); David L. Lunt, deceased, late of Tucson, AZ (US); by Geraldine Hogan, legal representative, Tucson, AZ (US)

(73) Assignee: Coronado Instruments, Inc., Irvine, CA (US)

( * ) Notice: Subject to any disclaimer, the term of this patent is extended or adjusted under 35 U.S.C. 154(b) by 63 days.

(21) Appl. No.: 11/123,945

(22) Filed: May 5, 2005

(65) Prior Publication Data

US 2005/0207014 A1   Sep. 22, 2005

Related U.S. Application Data

(63) Continuation-in-part of application No. 10/795,167, filed on Mar. 5, 2004, now Pat. No. 7,054,518.

(60) Provisional application No. 60/569,061, filed on May 7, 2004.

(51) Int. Cl.
  *G02B 6/26* (2006.01)
  *H01S 3/10* (2006.01)

(52) U.S. Cl. ............... 385/15; 385/12; 385/31; 385/900; 385/147; 385/140; 372/20; 372/92; 372/108

(58) Field of Classification Search .............. 385/12, 385/15, 901, 13, 31, 25, 147, 140, 900; 250/227.11; 372/20, 92, 108, 34
See application file for complete search history.

(56) References Cited

U.S. PATENT DOCUMENTS

| | | | |
|---|---|---|---|
| 6,181,726 B1 | 1/2001 | Lunt | 372/98 |
| 6,215,802 B1 | 4/2001 | Lunt | 372/34 |
| 6,498,800 B1* | 12/2002 | Watterson et al. | 372/20 |
| 7,054,518 B1* | 5/2006 | Lunt et al. | 385/15 |
| 2003/0087121 A1* | 5/2003 | Domash et al. | 428/641 |
| 2003/0210727 A1* | 11/2003 | Frisken et al. | 372/92 |
| 2004/0062945 A1* | 4/2004 | Domash et al. | 428/641 |
| 2004/0234198 A1* | 11/2004 | Wagner et al. | 385/27 |

* cited by examiner

*Primary Examiner*—Brian M. Healy
(74) *Attorney, Agent, or Firm*—Antonio R. Durando

(57) ABSTRACT

A solar filter assembly combines a high-precision Fabry-Perot etalon with a variety of conditioning filters judiciously selected to effectively block completely all radiation except for the spectral line of interest. In addition, a tuning mechanism is provided to precisely control the peak frequency of the filter's output by varying the optical length of the etalon's cavity.

25 Claims, 13 Drawing Sheets

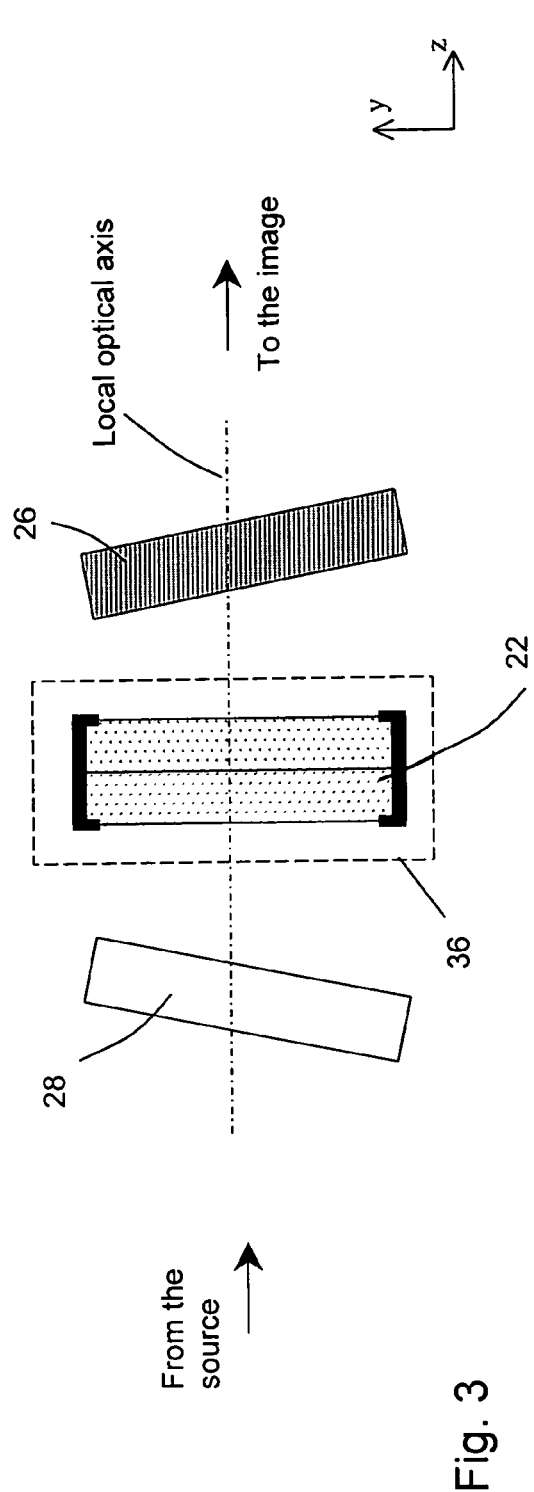
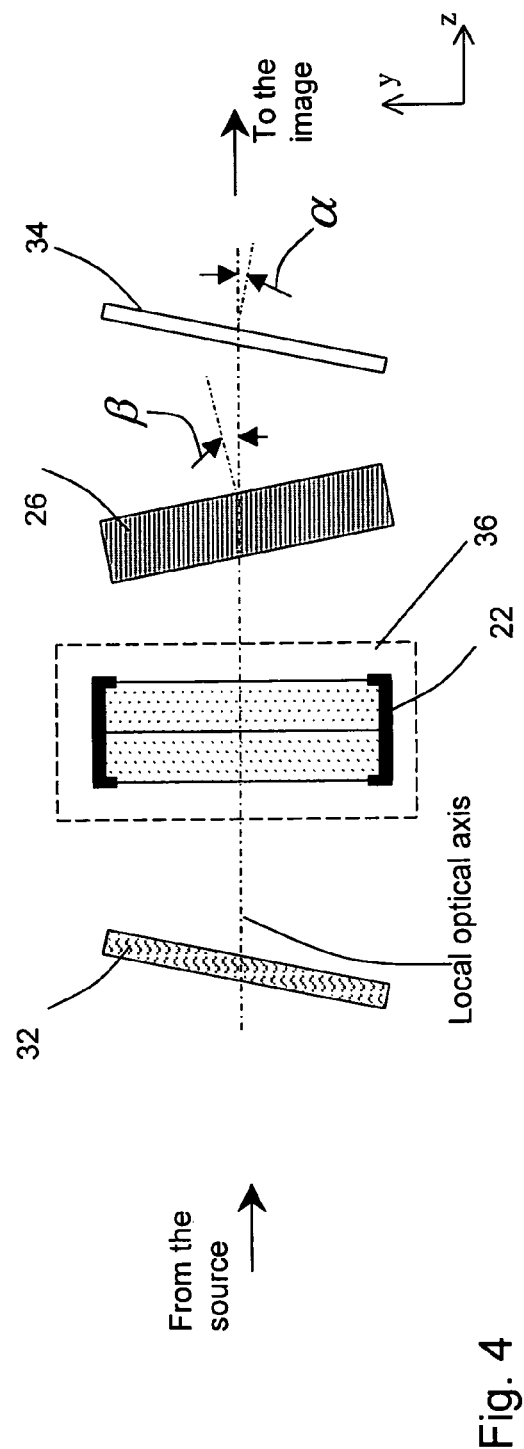
Fig. 3
Fig. 4

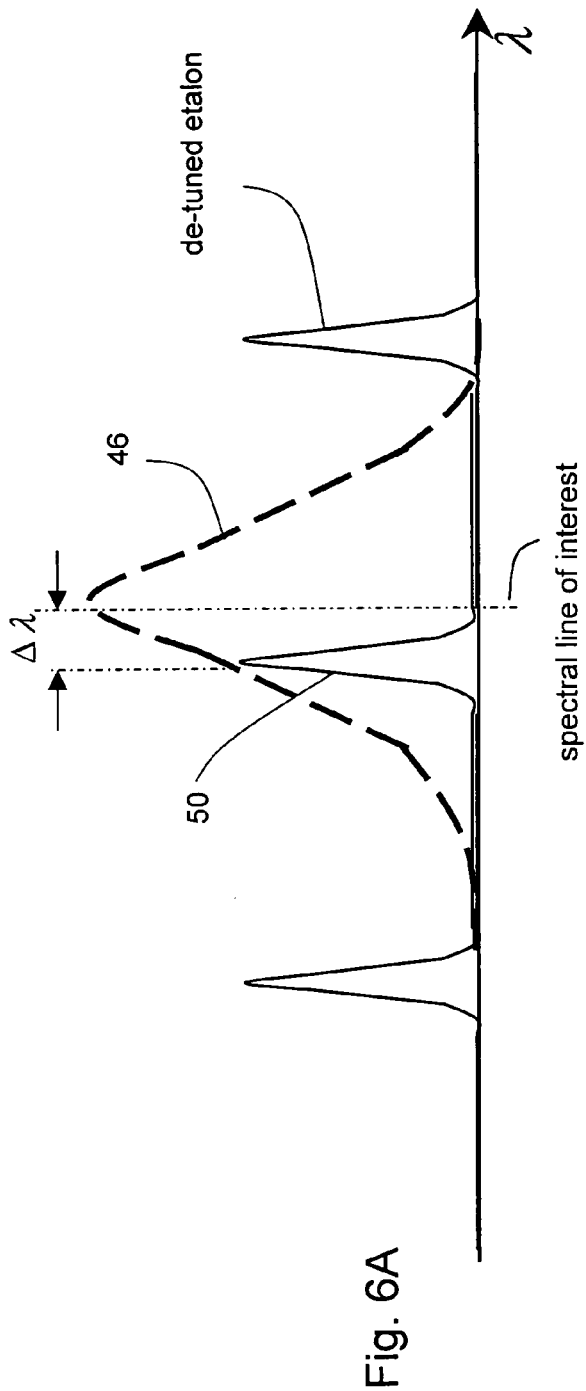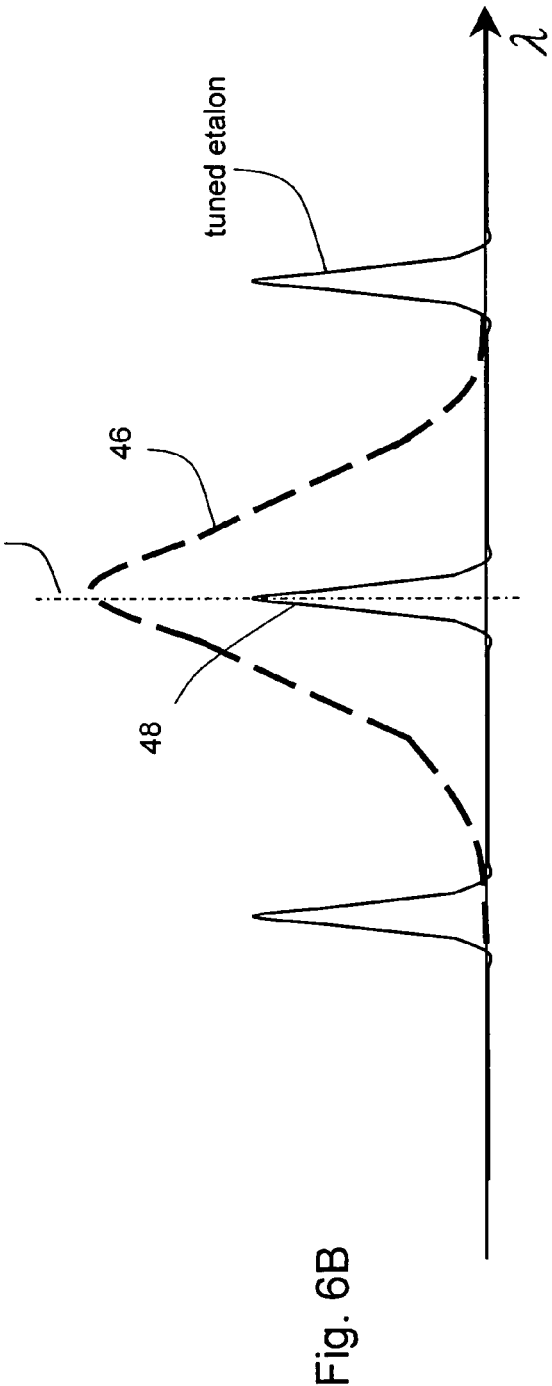
Fig. 6A
Fig. 6B

SOLAR TUNABLE FILTER ASSEMBLY

RELATED APPLICATIONS

This application is a continuation-in-part application of U.S. Ser. No. 10/795,167, filed on Mar. 5, 2004, now U.S. Pat. No. 7,054,518 and is based on U.S. Provisional Application Ser. No. 60/569,061, filed May 7, 2004.

BACKGROUND OF THE INVENTION

1. Field of the Invention

This invention is related in general to the field of optical filters. In particular, it relates to a tunable filter with an extremely narrow pass-band and a blocking stop-band extending beyond the visible spectrum of light.

2. Description of the Related Art

Various optical applications (such as imaging, detection of spectral signatures of chemical species, and remote sensing) are carried out at a very precise wavelength within the broad spectrum of sun light, which ranges from deep ultraviolet (UV) to far infrared (IR) radiation. For proper functioning, these applications require extremely narrow-band filtering of the incoming optical signal. The filtering efficiency determines the signal-to-noise ratio of the output and, therefore, the ability of the optical instrumentation to successfully perform its functions. For example, in lidars (radar-like optical instruments utilized for atmospheric measurements), the ability to select the required fixed narrow spectral bandwidth and also simultaneously block all background radiation (practically across the entire sunlight spectrum because the sun provides a very strong wide-band background) is of critical importance in view of the extremely low-level signals received by the instrument (in the order of photon counting, in some cases). The operational requirements are further complicated by the fact that the particular spectral line of interest may be de-tuned from the expected spectral position as a result of operational conditions (such Doppler shifts, for example). Currently, a single filter capable of meeting such demanding spectral characteristics does not exist.

Etalon devices are well known for producing a periodic comb-like spectral response with a period and peak wavelengths determined by the physical characteristics of the etalon. Thus, in the prior art, narrow-band filters for solar observation have been implemented using an etalon device combined with conventional thin-film filters designed to attenuate all signals except the spectral line of interest. As illustrated schematically in FIG. 1, an etalon consists of an optical cavity 10 with two reflective surfaces 12 and 14 having reflectivity R1 and R2, respectively. The desired reflectivity of the surfaces 12, 14 may be obtained in various equivalent ways, such as by coating either side of each surface. When a beam of light L impinges on the cavity 10, a portion of light RF is reflected out of the cavity while another portion TR is transmitted through the cavity. Because of multi-reflection interference in the cavity, both the reflected and the transmitted outputs have a periodic frequency spectrum and a shape that depends on the so-called "Finesse" of the etalon, a quantity that indicates the spectral selectivity of the etalon and can be calculated as a function of surface reflectivities. For example, for the case when R1=R2=R, the relationship between the reflectivity of the cavity and the width of the spectrum of the periodic wave produced on transmission by the cavity may be quantified by the following general equation:

$$\pi R/(1-R) = FSR/FWHM = \text{Finesse}$$

where R=R1=R2 is the reflectivity of each reflective surface in the cavity, FSR is the cavity's free-spectrum range, and FWHM is the full width of the transmission normalized-frequency spectrum curve at half maximum.

The "free-spectrum range" of an etalon cavity is the ration $c/(2l)$, where c is the speed of light and l is the optical length of a cavity. Free-spectrum range also refers to the distance (measured in the normalized-frequency domain) between peaks in the comb-like spectrum of the output of the cavity. Moreover, the exact frequency position of each periodic peak also depends of the cavity's optical length. Thus, the period and the peak frequencies of the frequency spectrum obtained from the cavity can be adjusted by varying the optical length of the cavity.

These properties of etalons have been used advantageously in the past to produce very narrow-band filters for solar observation by combining the etalon cavity with thin-film blocking filters having a pass-band overlapping the wavelength of interest in the spectrum produced by the etalon. The problem with these composite devices is that the blocking efficiency of thin-film filters is reduced at wavelengths removed from the band of interest. As a result, the periodic spectral lines produced by the etalon are blocked with diminishing effectiveness at frequencies in the visible range away from the spectral line of interest. Moreover, no blocking at all is provided in the IR and UV ranges of wavelengths.

The human eye is very susceptible to damage from exposure to IR and UV wavelengths because they produce extremely harmful thermal and chemical effects on the retina, respectively. Therefore, when human observation of an incoming image is desired in an instrument such as a telescope, it is necessary to attenuate these wavelengths below acceptable levels. In the case of white light, attenuation by a factor of at least $10^{-5}$ is considered safe. Thus, the use of appropriate filters for very narrow-band observation is not only important for isolating the signal of interest from noise and unwanted background signals but is also extremely important for safety while observing very bright objects such as the sun.

Therefore, any tunable filter capable of passing a signal with narrow bandwidth approaching that of a spectral line of interest while blocking all other wavelengths across the visible as well as the UV and IR spectra would represent a very desirable advance in the art. This invention achieves these goals using a tunable etalon cavity combined with a variety of conditioning filters adapted to selectively block all radiation other than the single order of interest in the etalon spectrum.

BRIEF SUMMARY OF THE INVENTION

The invention consists of combining a high-precision Fabry-Perot etalon with a variety of conditioning filters judiciously selected to effectively block completely all radiation except for the spectral line of interest. In addition, a tuning mechanism is provided to precisely control the peak frequency of the filter's output by varying the optical length of the etalon's cavity.

According to one aspect of the invention, the etalon is combined with an order-selection filter (OSF) designed to isolate the spectral order of interest from neighboring orders in the etalon's spectral output. The OSF may consist, for example, of a thin-film interference filter fabricated with a temperature-stable refractory oxide of dielectric material. Such a filter is designed to pass a single line in the periodic spectrum produced by the etalon cavity.

Because order-selection filters are not equally efficient in attenuating signals throughout the range of frequencies of solar radiation, a portion of the energy in the spectral lines neighboring the order of interest is undesirably transmitted through the filter, thereby diminishing the isolating effect of the etalon/OSF combination and producing a spectral output with unwanted background signals that are also potentially dangerous to the human eye. Thus, according to another aspect of the invention, a combination of energy-rejection filters (ERFs) with extended rejection zones is also used to correct this problem and attenuate all residual unwanted radiation in the output beam.

In the preferred embodiment of the invention, a first ERF component is used to block light with wavelengths greater than the spectral order of interest, including infrared radiation. A second ERF component is used to reject light with wavelength smaller than the spectral order of interest, including ultraviolet radiation. Thus, in combination, these ERF components eliminate not only the residual neighboring lines remaining after passing through the order-selection filter but also undesirable UV and IR radiation. As is well understood in the art of solar filter devices, each broad pass-band ERF component may be judiciously designed as described to remove most of the long-wave and short-wave light (as applicable) outside the desired pass-band, which is selected so as to allow complete transmission of the spectral order of interest with a sufficient bandwidth to accommodate fine-tuning of its central wavelength. In combination, the ERF components are selected with an optical density of at least 5 within the spectrally rejected regions, thus providing blocking levels of $10^{-5}$ or better.

The various filters are preferably oriented in a fashion that minimizes the residual reflection between their interfaces. That is, for example, the ERF and the OSF may be slightly tilted with respect to the local optical axis, while the etalon assembly may be mounted in a mechanism that allows tuning of the etalon cavity on-line. In addition, in order to minimize the degree of optical coupling between the components of the filter system, the outer surfaces of the filters are preferably AR-coated.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 3 illustrates the components of an actual embodiment of a filter assembly according to the invention.

FIG. 4 shows an embodiment of the invention wherein the ERF includes two separate components that independently block short waves and long waves.

FIGS. 6A and 6B illustrate the principle of tuning the filter assembly of the invention by varying the optical length of the etalon cavity.

DESCRIPTION OF THE PREFERRED EMBODIMENTS OF THE INVENTION

This invention evolved from a long-felt need in the field of solar telescopic observation. Over the last several decades, the manufacturers of solar filters have successfully improved the quality of their products by providing signal attenuation across the visible spectrum as required to permit observation of the sun, but have completely neglected the effects of infrared and ultraviolet components of sunlight. The invention provides the first tunable solar filter capable of selectively passing a single spectral line of interest while essentially blocking all other signals, including IR and UV radiation within the range of eye sensitivity. This performance is achieved with a novel combination of filtering elements wherein each is judiciously selected to provide a specific complementary function.

As used herein, the terms "order-selection filter" and "OSF" are used to refer to filters capable of transmitting a particular narrow-band signal, such as a single spectral line of the output of an etalon cavity, while stopping all other signals, including neighboring lines. It is understood that no perfect OSF exists and that, in practice, the rejection efficiency of OSFs diminishes at wavelengths progressively removed from the pass-band. The terms "energy-rejection filter" and "ERF" are similarly used to refer to filters capable of rejecting substantially all wavelengths greater than (or alternatively smaller than) a particular pass-band of interest. It is also understood that no such filter exist that is capable of producing an ideal step-like spectral output at a desired wavelength; instead, a transition range from maximum transmission to maximum rejection is unavoidable and has to be accounted for in the design of each ERF dedicated to a particular application.

Figure 2:
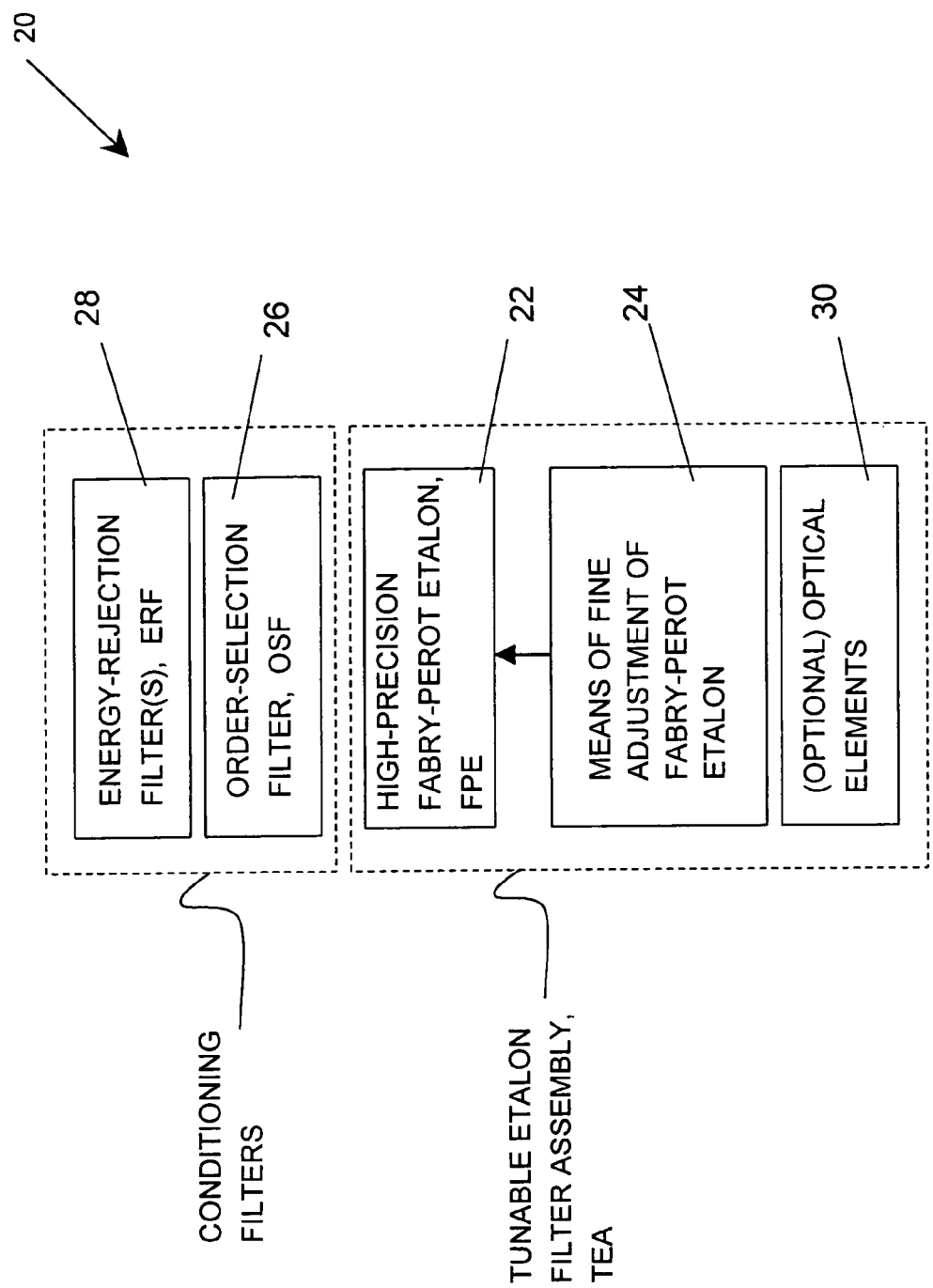
FIG. 2 is a schematic representation of the combination of filter elements used in the tunable narrow-band filter assembly of the invention.

Referring to the figures, wherein the same reference numerals and symbols are used throughout to refer to like parts, FIG. 2 is a schematic representation of the combination of filter elements used in a typical tunable filter assembly 20 according to the invention. The filter system includes a tunable etalon filter 22 and a set of conditioning filters. The etalon filter 22 is equipped with some means 24 for varying the optical length of the etalon cavity in order to provide fine adjustment of the spectral performance of the etalon. Various mechanisms are known in the art to tune etalon filters, such as described in co-owned U.S. Ser. No. 10/795,167 and U.S. Ser. No. 10/841,131.

The set of conditioning filters includes an order-selection filter 26 designed to select a pre-determined order of the etalon filter 22, and at least one energy-rejection filter 28 (preferably a combination of them) designed to provide broad-band blocking with extended rejection zones that include the infrared and ultraviolet spectra. In combination, the ERF and OSF serve the dual goals of providing the required level of signal attenuation at the operational pass-band defined by the etalon and of assuring the required level of optical density outside that pass-band, especially in the IR and UV spectral ranges. Additional optical elements 30 may be used to adjust the overall level of attenuation or perform other optical functions, if necessary for particular applications.

FIG. 3 illustrates the order of the components of an actual embodiment of a filter assembly of the invention (with respect to the incoming light) with the etalon operating in transmission. A broad-band radiation (for example, white light, possibly of high intensity) is incident upon an ERF 28 positioned at the entrance of the optical system, the ERF being selected to have a broad pass-band and remove most of the long-wave and short-wave light outside its pass-band. The ERF should have an optical density of at least 5 within the spectrally rejected regions, thus providing blocking levels of at least $10^{-5}$. Other levels of blocking may be acceptable depending on the particular application. The transmission of the ERF is preferably maximized at the operational wavelength. As a result, the majority of the potentially damaging UV radiation as well as the incoming heat (IR radiation) are blocked from entering the optical system. In addition to reducing exposure of the end user, this fact advantageously facilitates the choice of materials that can be used to ensure the required thermal stability in the optical system downstream of the filter. The ERF is followed by a tunable etalon 22 which defines the required narrow pass-band of interest while further reducing the amount of light propagating towards the image plane or detector. Finally, an order-selection filter 26 rejects the unwanted orders of the etalon, transmitting towards the image plane only the required narrow pass-band.

In the preferred embodiment of the invention, the ERF is comprised of the combination of two separate components 32 and 34 to independently block short waves and long waves, respectively, as illustrated in FIG. 4. These components may be placed within the optical train of the filter system in any order. For example, as shown in the figure, the short-wave blocking filter 32 may precede the long-wave blocking filter 34 in the optical train, but the reverse order would also be acceptable, the choice being based for example on a consideration of which part of the spectrum must be preferentially blocked from entering the optical system. The ERF short-wave blocking component 32 preferably operates as an absorption filter (e.g., color glass, although a thin-film implementation is also possible), while the long-wave blocking component 34 is preferably an induced-transmission filter, both well known in the art.

The order-selection filter 26 has a bandwidth and pass-band shape sufficiently narrow and steep to block the adjacent orders of the etalon, and has rejection zones wide enough so that when they overlap the rejection zones of the energy-rejection filter components 32, 34 all light within the region of spectral sensitivity of the detector of the optical system is blocked with exception of the required pass-band defined by the etalon 22. The OSF has an optical density of at least OD5 within spectrally rejected regions, thus providing blocking levels of at least $10^{-5}$. The OSF is preferably structured to operate as a thin-film interference filter, fabricated with hard, refractory oxides of dielectric materials with very low thermal coefficient (<0.003 nm/° C.) and a refractive index (on the order of 1.9) significantly higher than that of typical glass. Titania (titanium oxide), zirconia (zirconium oxide), silica (silicon oxide), and titanium pentoxide are known dielectric materials that exhibit these properties.

In the preferred embodiment, the filters are oriented in a fashion that minimizes residual reflections produced by them. For example, the ERF and the OSF may be slightly tilted with respect to the local optical axis by respective angles $\alpha$ and $\beta$ in the yz-plane, as illustrated in FIG. 4. The etalon filter 22 may be mounted in a mechanism 36 adapted to adjust the optical length of the etalon cavity (by rotation or otherwise) in order to tune the etalon on-line. In addition, to minimize the degree of optical coupling between the various components of the filter assembly, the outer surfaces of the filters may also be AR-coated.

In other embodiments, the stand-alone filtering components of the tunable filter assembly may be replaced by filtering elements deposited on the surface of imaging components of the optical system (such as thin-film filters), or the elements of the optical system themselves may be made of materials having the required filtering properties (such as absorption filters). This combination of filtering and imaging functions may be used to simplify the overall structure of the optical system employing the tunable filter assembly of the invention. It is understood that in general the filters in the system of the invention may be used in any sequential order to produce an operational tunable filter assembly because the spectral performance of the group of optical filters is multiplicative.

Figure 5:
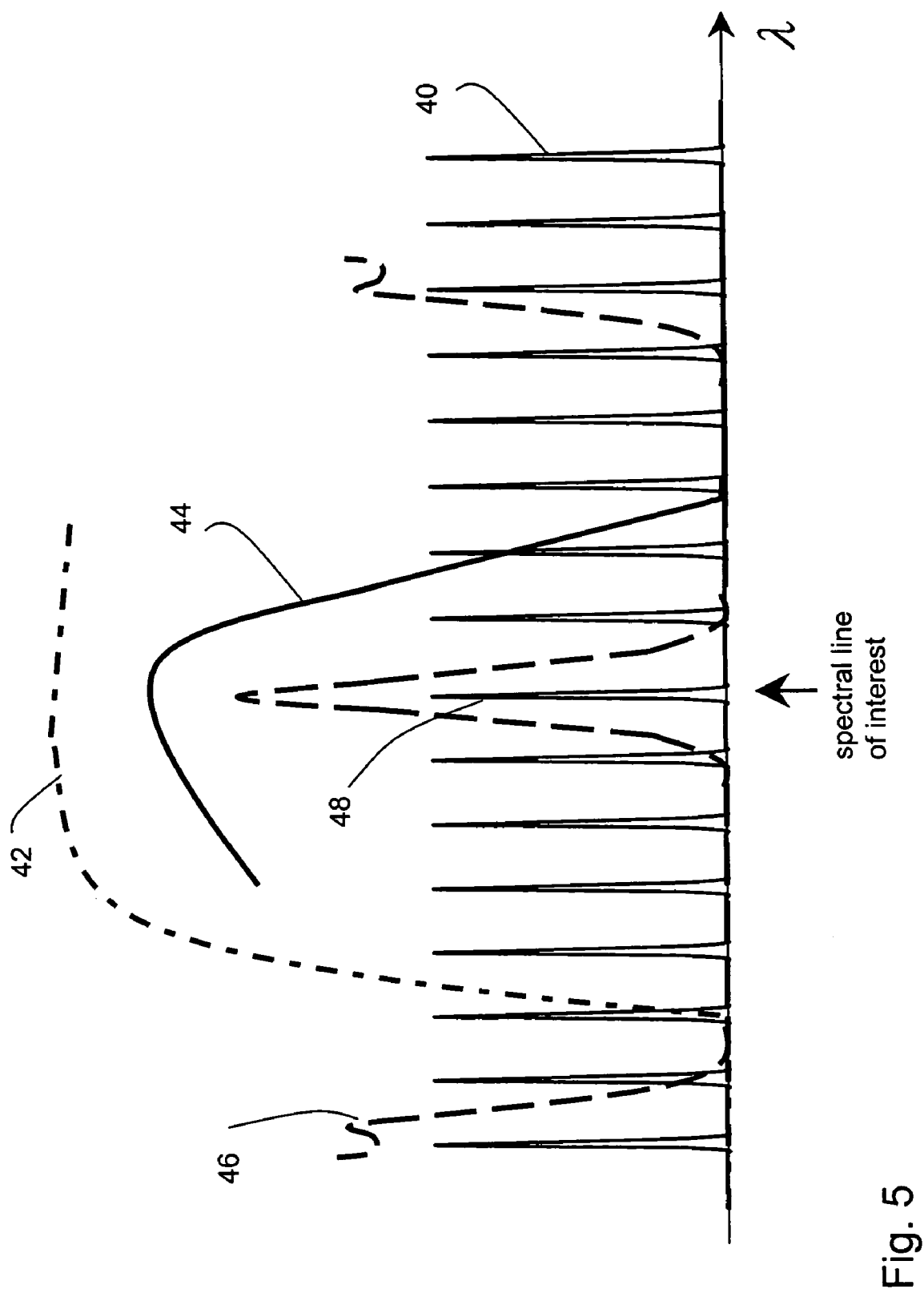
FIG. 5 illustrates the overall spectral performance achievable with a tunable filter assembly constructed according to the invention.

FIG. 5 illustrates the overall spectral performance achievable with a tunable filter assembly constructed according to the invention (not to scale) wherein the etalon is utilized in transmission. Referring to the structure of FIG. 4, the combination of the transmission characteristics of the etalon cavity 22 (the comb-like line 40), the short-wave blocking component 32 of the ERF (the dot-dashed line 42), the long-wave blocking component 34 of the ERF (the solid line 44), and the order-selection filter 26 (the dashed line 46) enables the selection and isolation of the spectral line of interest 48.

FIGS. 6A and 6B illustrate the principle of tuning the filter assembly of the invention (on an enlarged spectral scale with respect to FIG. 5). When the selected pass-band of the etalon output is off-line (as shown in FIG. 6A by the spike 50, de-tuned from spectral line of interest 48 by Δλ), the optical length of the etalon cavity is tuned in conventional manner to shift the central wavelength of the pass-band and bring it back on-line, as seen in FIG. 6B.

Figure 7:
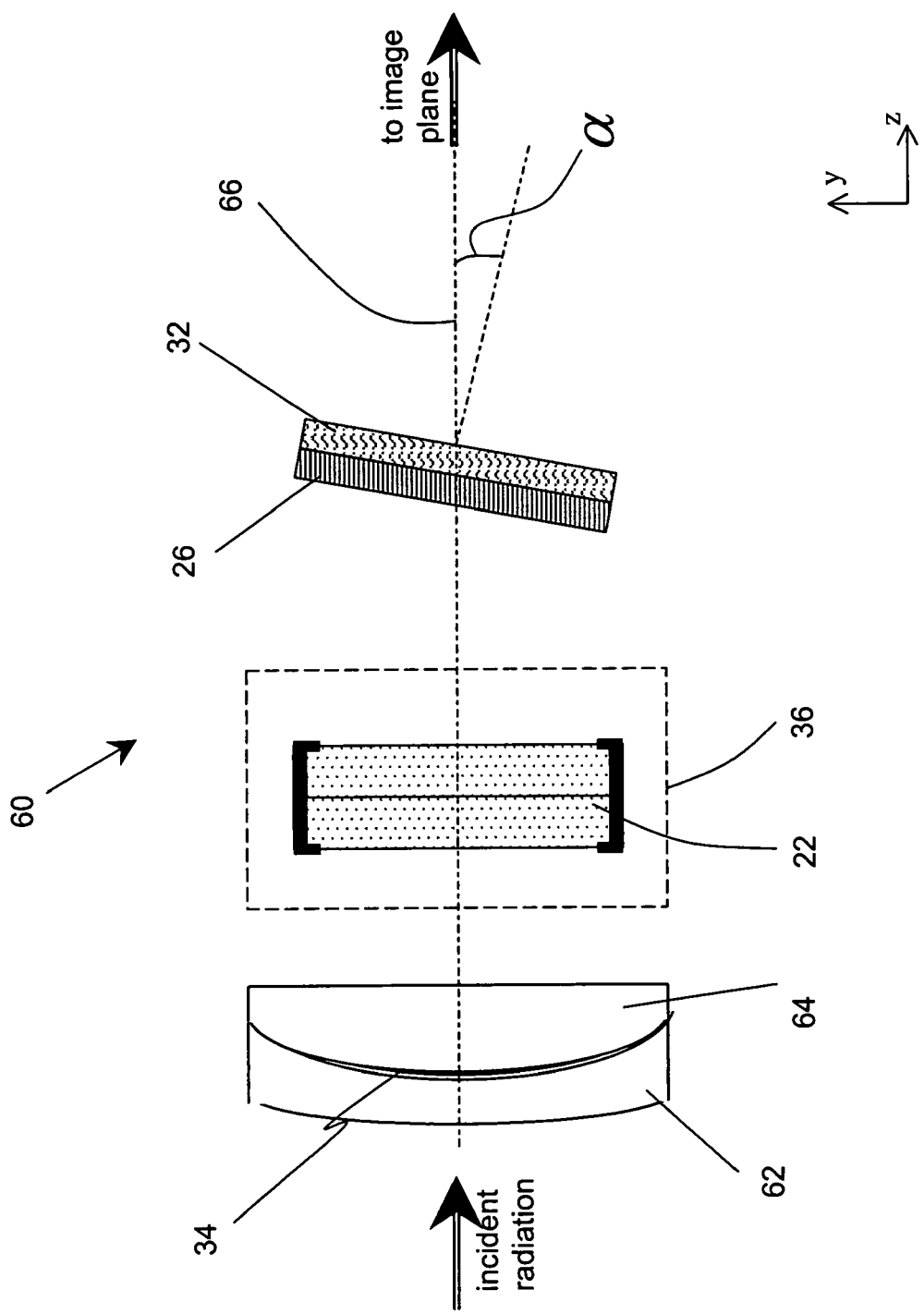
FIG. 7 illustrates another embodiment of the invention wherein the long-wave blocking component of the ERF is implemented as an induced-transmission filter incorporated between the sub-components of the collecting lens of the optical system.

FIG. 7 illustrates another embodiment 60 of a tunable filter assembly according to the invention wherein the long-wave blocking component 34 of the ERF is implemented as an induced-transmission filter (ITF) incorporated between the sub-components 62,64 of the collecting lens of the optical system. This implementation has the advantage of protecting the entire system from incoming IR-light at the density level of at least 5, thereby minimizing heat effects and improving the thermal stability of the instrument. The etalon 22, preferably mounted in a tuning mechanism 36, transmits a comb of wavelengths from the light filtered by the blocking component 34 and propagated by the collecting lens. A stand-alone order-selection filter 26, preferably tilted with respect to the local optical axis 66, is integrated with the short-wave blocking component 32 of the ERF, thereby selecting a single pass-band form the remaining part of the comb-transmission of the etalon 22.

Figure 8:
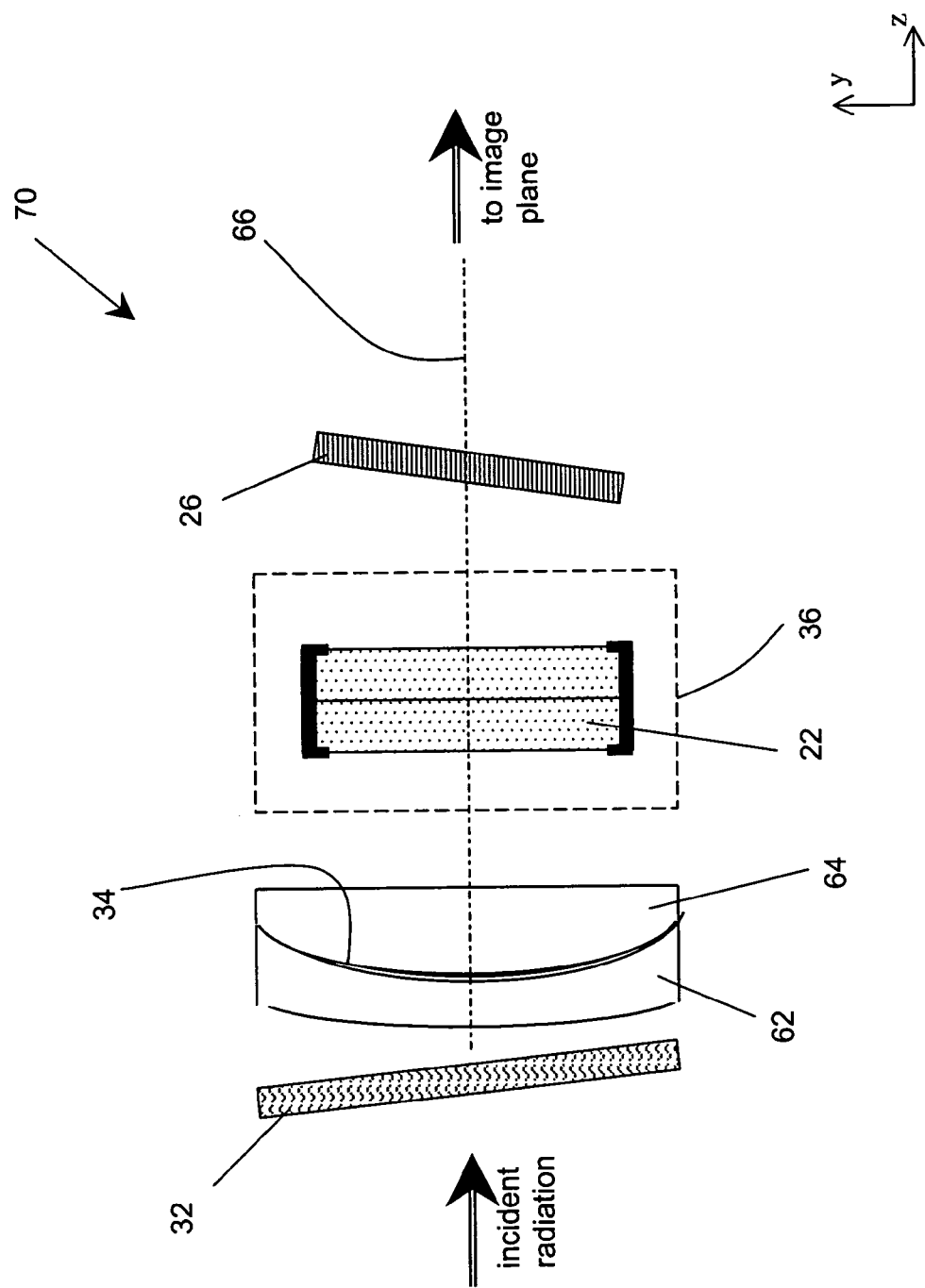
FIG. 8 illustrates an alternative embodiment of the invention operating in transmission wherein the short-wave blocking component of the ERF is placed in front of the collecting lenses, which serves the purpose of protecting the collecting optics and from UV exposure as well as from mechanical damage.
Figure 9:
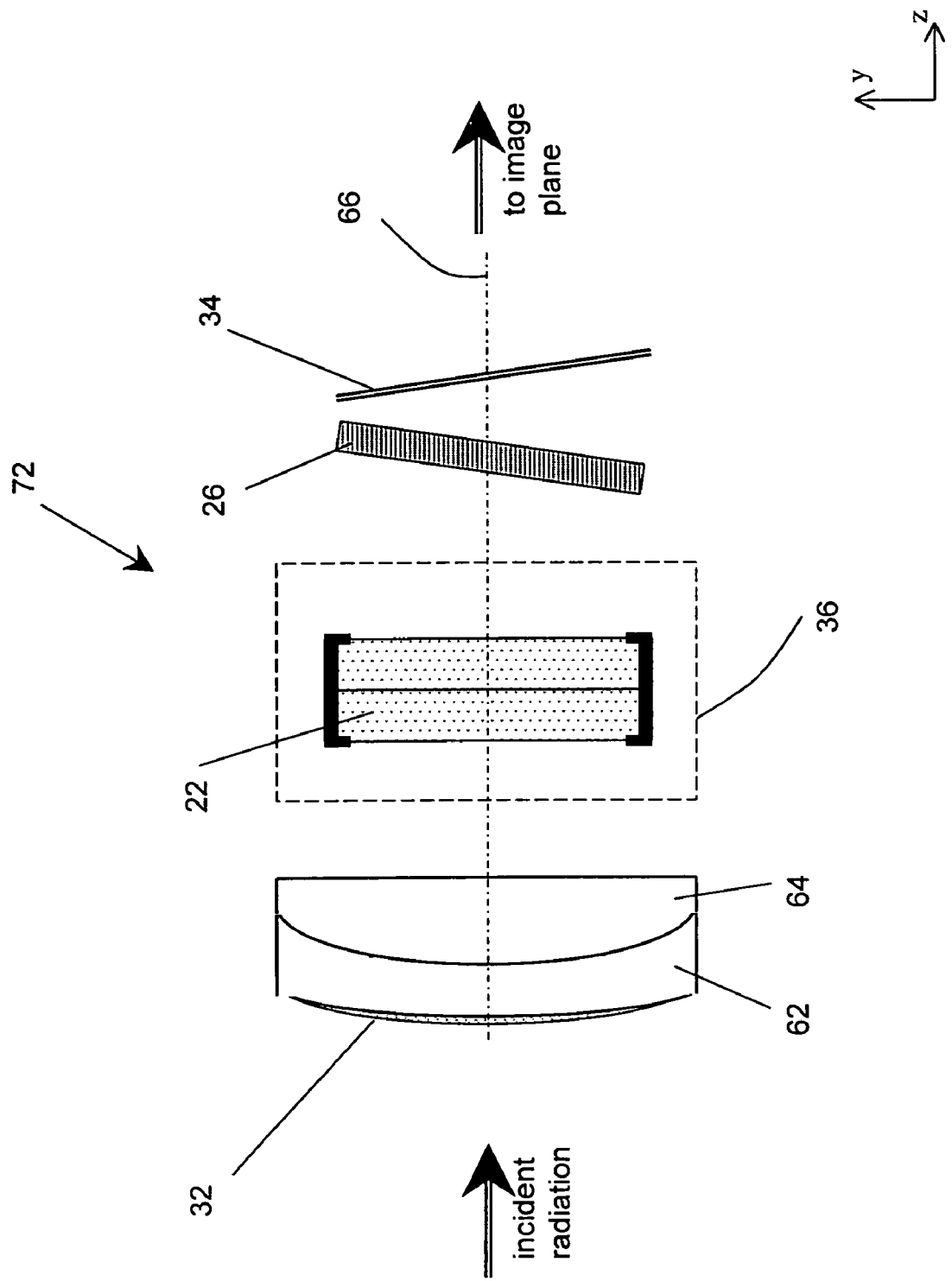
FIG. 9 shows yet another embodiment of the invention wherein the short-wave blocking component of the ERF is formed as a thin-film filter on the front surface of the light collecting optics, while the long-wave blocking component of the ERF is added as a separate filter positioned at the end of the filter train.

FIG. 8 illustrates an alternative embodiment 70 of the invention operating in transmission wherein the short-wave blocking component 32 of the ERF is placed in front of the collecting lenses 62,64, which serves the purpose of protecting the collecting optics and from UV exposure as well as from mechanical damage. The filter assembly 70 is otherwise the same as the embodiment of FIG. 7. FIG. 9 shows yet another embodiment 72 wherein the short-wave blocking component 32 of the ERF is formed as a thin-film filter on the front surface of the light collecting optics, while the long-wave blocking component 34 of the ERF is added as a separate filter positioned at the end of the filter train.

Figure 10:
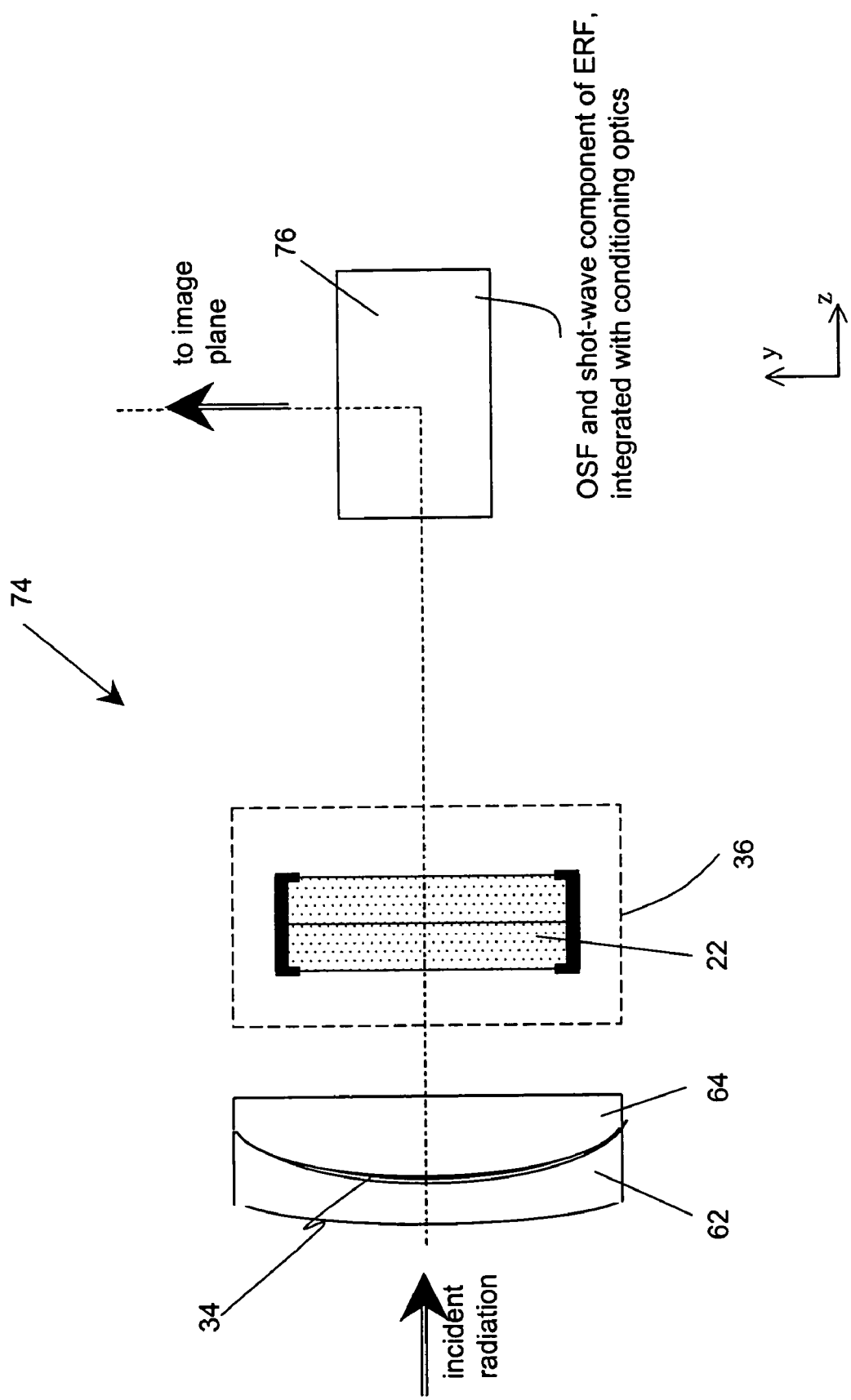
FIG. 10 illustrates still another embodiment of the invention wherein some filtering components are integrated with the conditioning optical components of the system.

FIG. 10 illustrates still another embodiment 74, wherein some filtering components (for example, the OSF 26 and the short-wave ERF component 32) are integrated with the conditioning optical components 76 of the system (such as a pentaprism, right-angle prism, or reflective mirror folding the optical path by 90°, as shown). This integration may be achieved in conventional manner by depositing thin-film filters on the surface of the conditioning optics.

Figure 11:
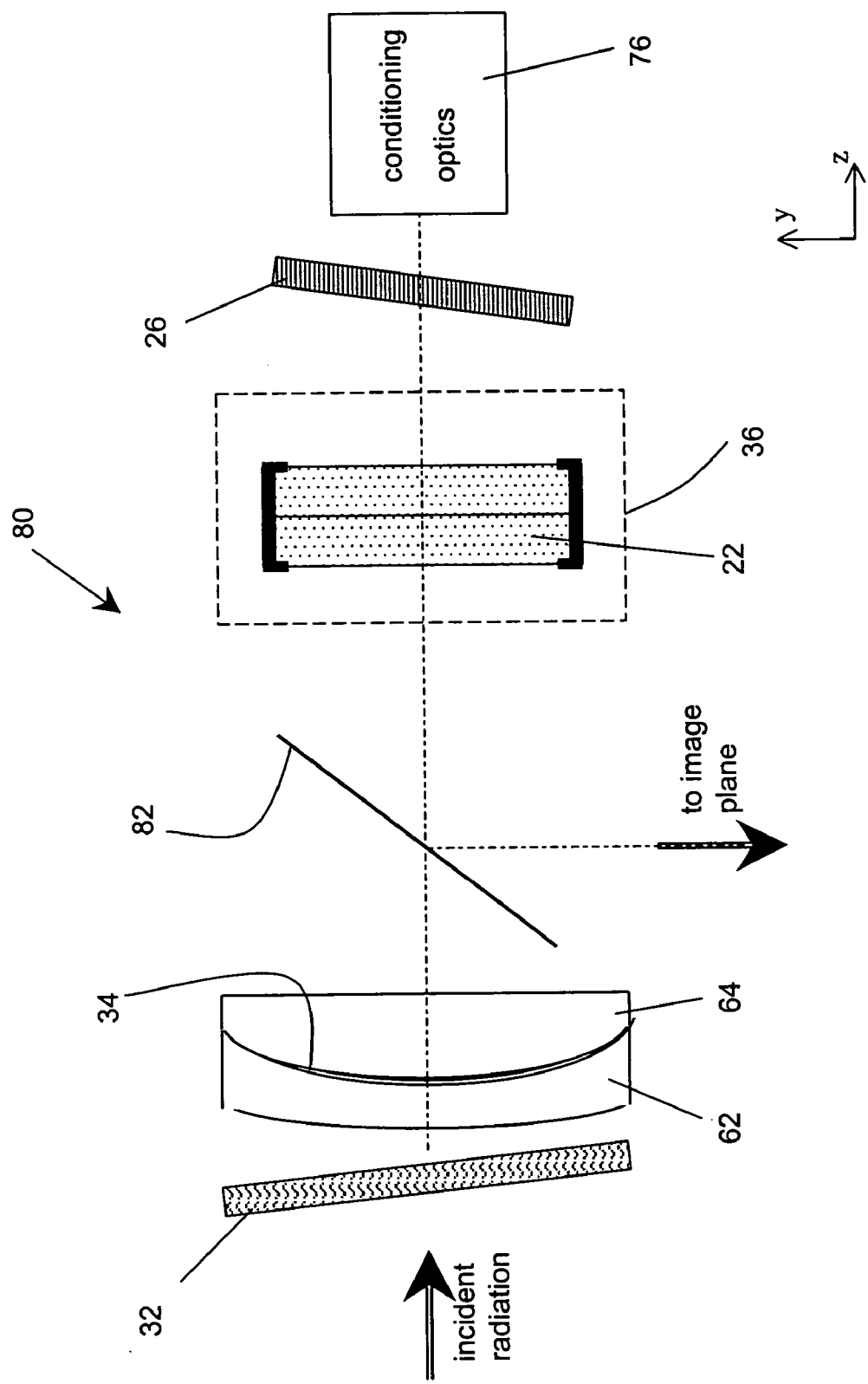
FIG. 11 illustrates another embodiment in which both the etalon and the OSF are traversed twice and the optical path is folded toward the image plane first by conditioning optics and then by a beam-splitter.
Figure 12:
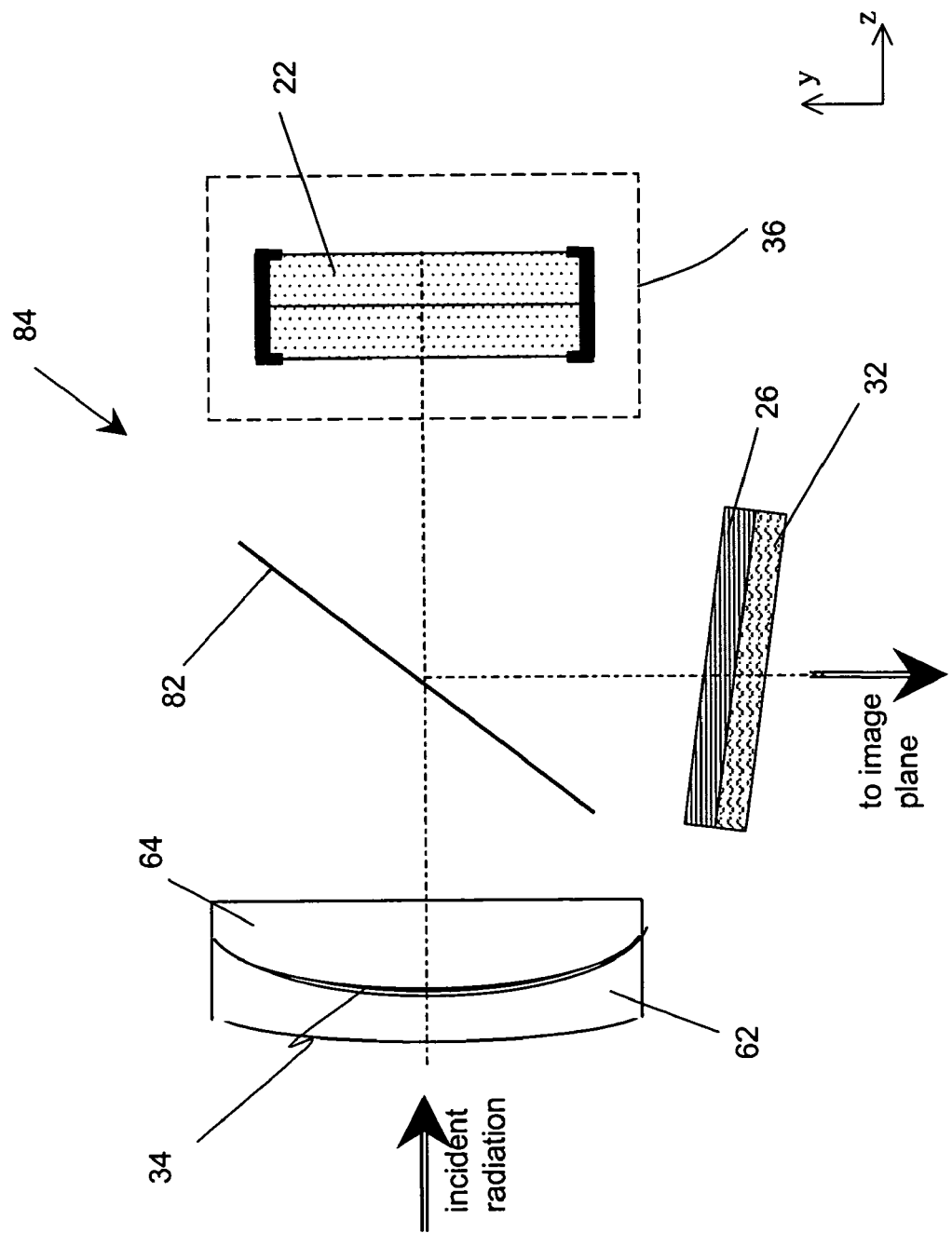
FIG. 12 illustrates a single-pass embodiment of the invention operating in reflection.

FIG. 11 illustrates another embodiment 80 in which all filter components operate in transmission. Both the etalon 22 and the OSF 26 are traversed twice by an optical path that is folded toward the image plane first by conditioning optics 76 and then by a beam-splitter 82. This embodiment is used to increase the Finesse (spatial resolution) of the filter. Compared to a conventional two-etalon stack, this arrangement has the advantage of having the light pass through the same etalon, with the exact optical characteristics, twice, which is hard to attain with two separate stacked etalons. FIG. 12 illustrates a single-pass embodiment 84 of the invention wherein the etalon 22 operates in reflection.

Figure 1:
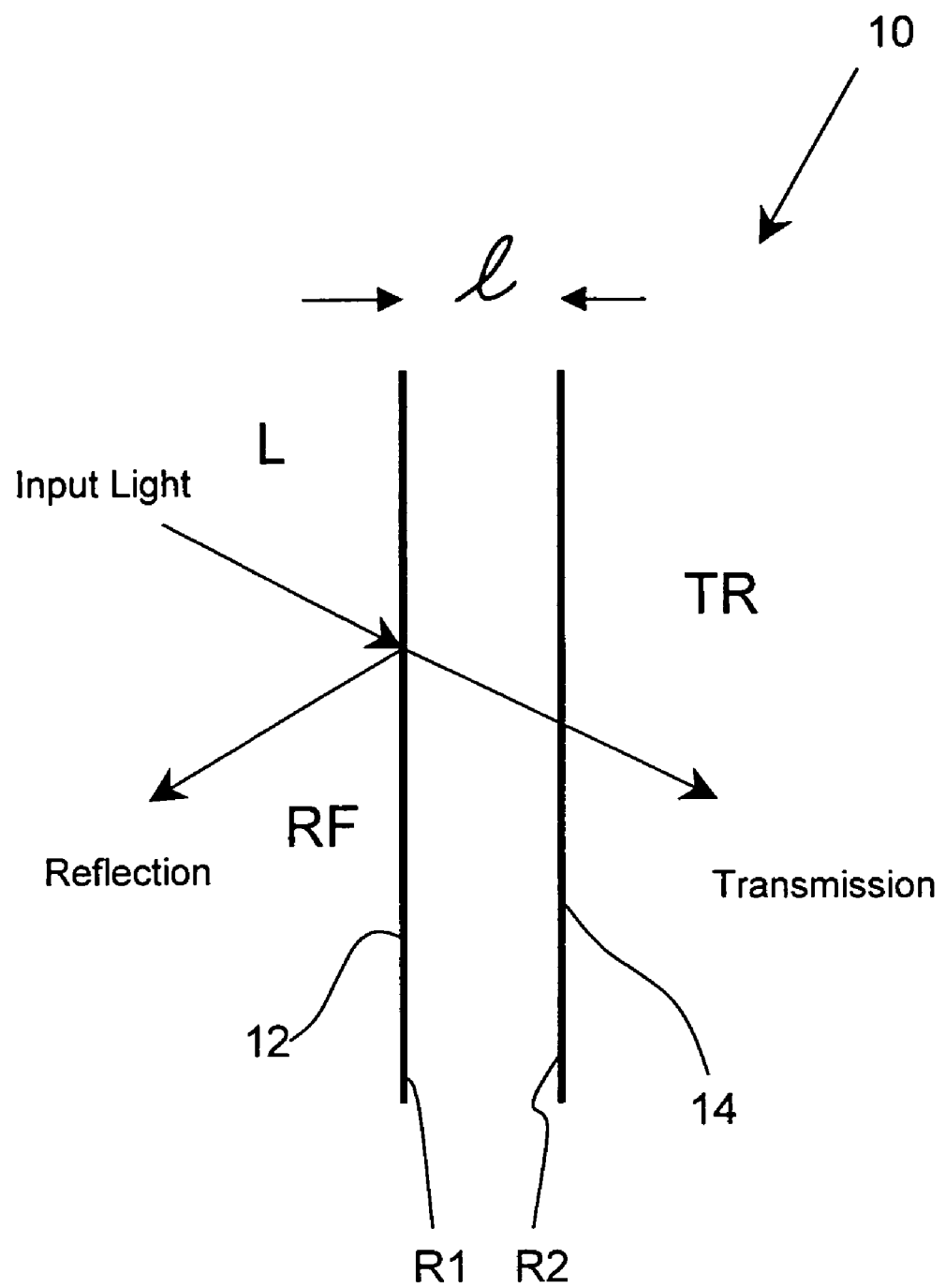
FIG. 1 is a schematic illustration of a conventional Fabry-Perot etalon cavity.
Figure 13:
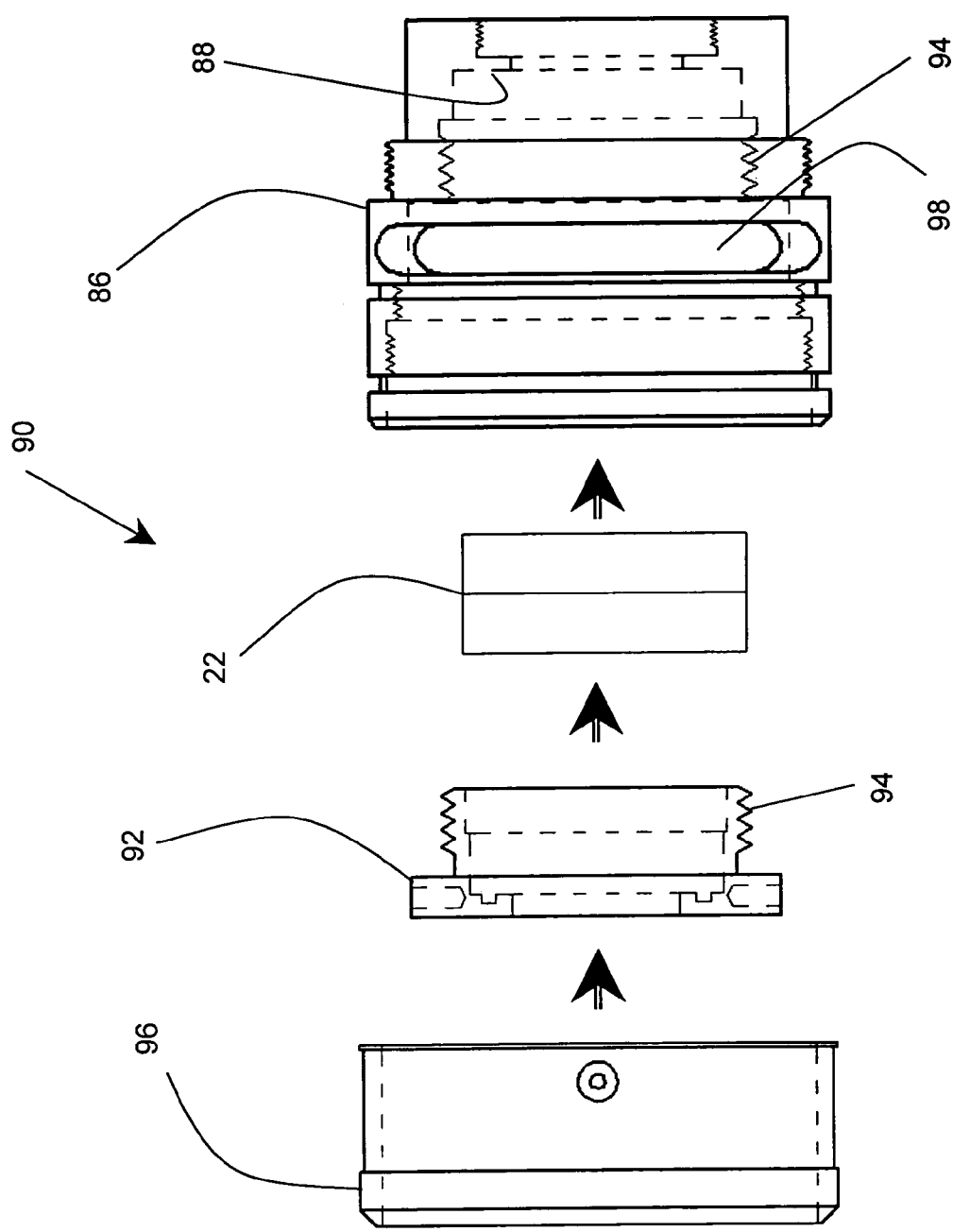
FIG. 13 is an exploded view of an actual embodiment of the invention wherein the etalon assembly is fine tuned using counterbalanced compressive forces applied to the etalon cavity in order to precisely vary its optical length as needed to meet operating specifications.
Figure 14:
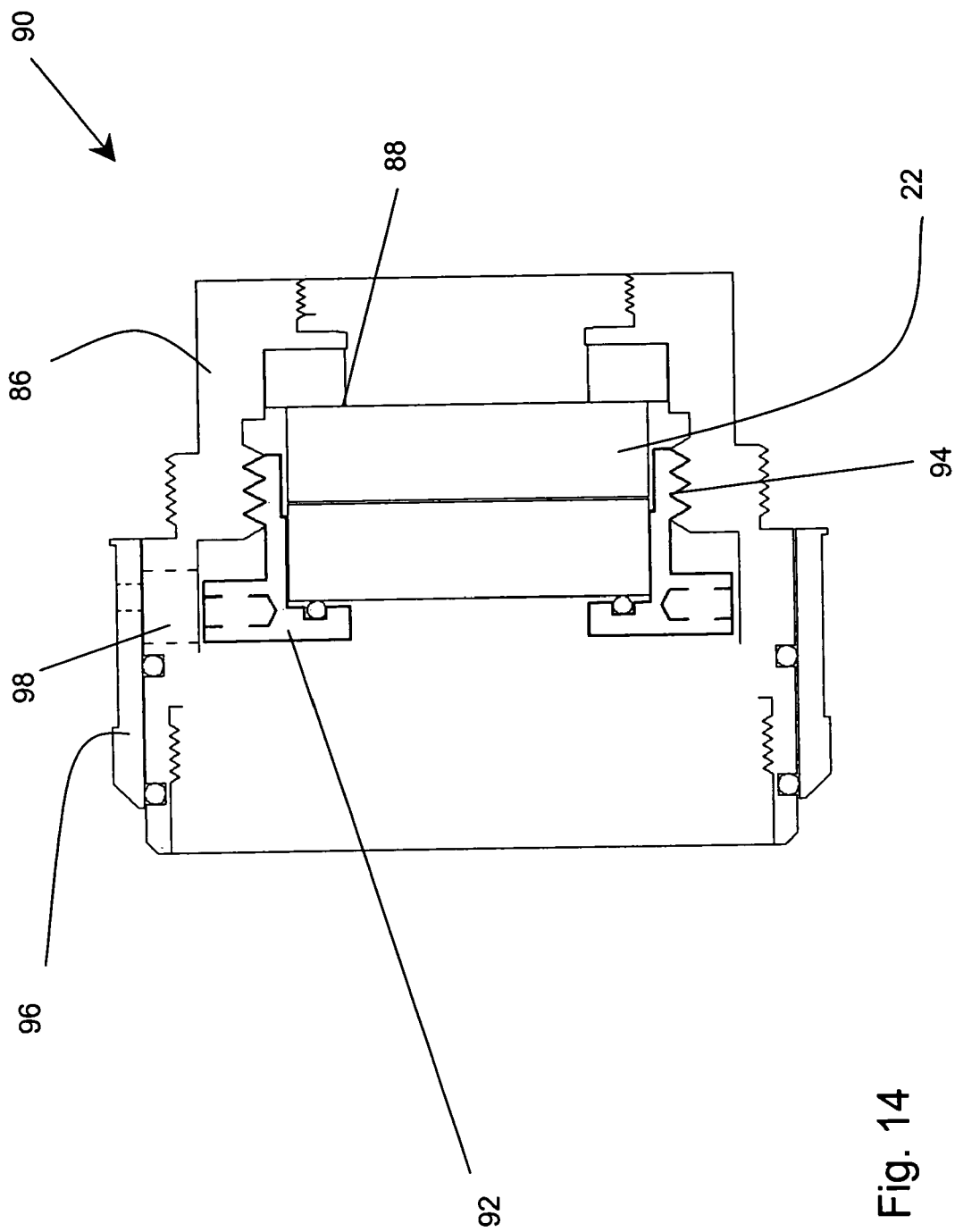
FIG. 14 shows the embodiment of FIG. 13 in assembled condition.

Finally, FIGS. 13 and 14 illustrate a preferred, actual embodiment 90 of the invention tuned by applying counterbalanced compressive forces on a conventional etalon 22 to vary in very precise fashion the optical length of its cavity, as fully disclosed in Ser. No. 10/795,167. The optical length of the etalon is determined by the thickness of its spacers (see FIG. 1) which separate the optical surfaces of the cavity by exerting the force necessary to keep them apart at a predetermined distance. On the other hand, all spacer materials are characterized by a certain degree of resilience (within the Young's Modulus limits of the material) which affords an opportunity to change the thickness of the spacers by applying a controlled compressive force over them.

Accordingly, as shown in the exploded view of FIG. 13, a conventional etalon 22 is mounted inside a cylindrical main cell 86 butting against an appropriately formatted recess 88. A tuning cell 92, positioned over the etalon inside the main cell 86, is mated to the main cell via a mating threads 94 which, when the thread is engaged, applies a compressive force onto the etalon 22. The degree of compression of the etalon (and, therefore, the degree of its spectral tuning) varies within predetermined limits depending on how deep the tuning cell is threaded into the main cell. Finally, a collar 96 is positioned over the main cell 86 and rigidly attached to the tuning cell. As a result, in operation a mere rotation of the collar mechanically translates the rotation of the tuning cell 92, which in turn engages more or less of the mating threads 94 to compress and therefore tune the etalon 22. One or more slots 98 are provided in the main cell 96 to house energy-rejection order-selection filters according to the present invention. FIG. 14 shows the tunable filter 90 in assembled condition.

Thus, a solar filter assembly has been described that provides a combination of narrow-band spectral selection with high-level spectral blocking out of the band of interest and the ability to fine-tune the position of the selected spectral line. The invention has been shown and described with respect to certain preferred embodiments and features, but it is understood that the scope of the invention is intended to encompass other embodiments which, although not described, may be or become obvious to those skilled in the art. For example, the collecting lens (or any other appropriate optics of the optical system incorporating the filter assembly of the invention) could be fabricated from absorptive materials providing the same spectral performance of a stand-alone short-wave ERF.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A narrow-band filter assembly comprising:
    an etalon cavity adapted to produce a periodic spectral response of predetermined finesse;
    an order-selection filter for blocking all radiation except for a single spectral line of interest in said spectral response of the etalon cavity;
    a first energy-rejection filter selected so as to pass said spectral line of interest and substantially block the spectral response at wavelengths longer than the spectral line of interest; and
    a second energy-rejection filter selected so as to pass said spectral line of interest and substantially block the spectral response at wavelengths shorter than the spectral line of interest.

2. The filter assembly of claim 1, further comprising means for tuning said etalon cavity by changing the optical length of the cavity.

3. The filter assembly of claim 2, wherein said first and second energy-rejection filters are positioned in front of the etalon cavity and said order-selection filter is placed behind the etalon cavity in the optical train of the assembly.

4. The filter assembly of claim 3, wherein said first and second energy-rejection filters and said order-selection filter are positioned with respect to a local optical axis so as to minimize residual reflections.

5. The filter assembly of claim 2, wherein said order-selection filter is positioned behind the etalon cavity, said first energy-rejection filter is placed behind the order selection filter, and said second energy-rejection filter is placed in front of the etalon cavity in the optical train of the assembly.

6. The filter assembly of claim 5, wherein said first and second energy-rejection filters and said order-selection filter are positioned with respect to a local optical axis so as to minimize residual reflections.

7. The filter assembly of claim 2, wherein said order-selection filter is positioned behind the etalon cavity, said second energy-rejection filter is placed behind the order selection filter, and said first energy-rejection filter is integrated with collecting optics in front of the etalon cavity in the optical train of the assembly.

8. The filter assembly of claim 7, wherein said second energy-rejection filters and said order-selection filter are positioned with respect to a local optical axis so as to minimize residual reflections.

9. The filter assembly of claim 2, wherein said order-selection filter is positioned behind the etalon cavity, said first energy-rejection filter is integrated with collecting optics in front of the etalon cavity, and said second energy-rejection filter is placed in front of the collecting optics in the optical train of the assembly.

10. The filter assembly of claim 9, wherein said second energy-rejection filters and said order-selection filter are positioned with respect to a local optical axis so as to minimize residual reflections.

11. The filter assembly of claim 2, wherein said order-selection filter is positioned behind the etalon cavity, said first energy-rejection filter is placed behind the order-selection filter, and said second energy-rejection filter consists of a thin-film filter deposited on collecting optics in front of the etalon cavity in the optical train of the assembly.

12. The filter assembly of claim 11, wherein said first energy-rejection filter and said order-selection filter are positioned with respect to a local optical axis so as to minimize residual reflections.

13. The filter assembly of claim 2, wherein said order-selection filter and said second energy-rejection filter are integrated with conditioning optics following the etalon cavity, and said first energy-rejection filter is integrated with collecting optics in front of the etalon cavity in the optical train of the assembly.

14. The filter assembly of claim 2, wherein said order-selection filter is positioned behind the etalon cavity, said first energy-rejection filter is integrated with collecting optics in front of the optical cavity, and said second energy-rejection filter is placed in front of the collecting optics in the optical train of the assembly, and wherein the optical path is folded backward by conditioning optics behind the order-selection filter and is further folded toward an image plane by a beam-splitter placed between the collecting optics and the etalon cavity.

15. The filter assembly of claim 14, wherein said second energy-rejection filter and said order-selection filter are positioned with respect to a local optical axis so as to minimize residual reflections.

16. The filter assembly of claim 2, wherein said first energy-rejection filter is integrated with collecting optics in front of the optical cavity, the optical path is folded toward an image plane by a beam-splitter placed between the collecting optics and the etalon cavity, and said order-selection filter and second rejection filter are positioned between the beam-splitter and the image plane in the optical train of the assembly.

17. The filter assembly of claim 16, wherein said second energy-rejection filter and said order-selection filter are positioned with respect to a local optical axis so as to minimize residual reflections.

18. The filter assembly of claim 2, wherein said means for tuning said etalon cavity by changing the optical length of the cavity includes variable means for adjusting a distance between optical surfaces in said cavity.

19. The filter assembly of claim 18, wherein said variable means operates by applying a variable force to vary a distance between said optical surfaces and said variable force is a resultant of two counteracting opposite forces urging at least one of said optical surfaces in opposite directions.

20. The filter assembly of claim 1, wherein said first and second energy-rejection filters have an optical density of at least 5 within spectrally rejected regions.

21. The filter assembly of claim 2, wherein said first and second energy-rejection filters have an optical density of at least 5 within spectrally rejected regions.

22. The filter assembly of claim 1, wherein said order-selection filter has an optical density of at least 5 within spectrally rejected regions.

23. The filter assembly of claim 21, wherein said order-selection filter has an optical density of at least 5 within spectrally rejected regions.

24. The filter assembly of claim 1, wherein said order-selection filter comprises a thin-film interference filter fabricated with a hard refractory oxide material.

25. The filter assembly of claim 24, wherein said oxide material is selected from the group consisting of titanium oxide, zirconium oxide, silicon oxide, or titanium pentoxide.

* * * * *